United States Patent [19]

Ellis

[11] 4,007,676
[45] Feb. 15, 1977

[54] SEGMENTING KNIFE FOR APPLE SEED CELLING MACHINE

[75] Inventor: Robert G. Ellis, Richmond, Calif.

[73] Assignee: Atlas Pacific Engineering Company, Emeryville, Calif.

[22] Filed: Apr. 22, 1975

[21] Appl. No.: 570,402

Related U.S. Application Data

[62] Division of Ser. No. 431,691, Jan. 9, 1974, Pat. No. 3,962,963, and Ser. No. 247,838, April 26, 1972, Pat. No. 3,869,974.

[52] U.S. Cl. .................................... 99/545; 30/302
[51] Int. Cl.² .................... A23N 3/00; A47J 25/00; B26D 4/00; B26B 3/00
[58] Field of Search ................... 99/537, 538, 545; 30/114, 302, 303; 83/407

[56] References Cited

UNITED STATES PATENTS

| 1,146,085 | 7/1915 | McVey | 99/545 |
| 2,383,814 | 8/1945 | Richardson | 99/545 |
| 3,869,974 | 3/1975 | Ellis | 99/547 |

FOREIGN PATENTS OR APPLICATIONS

| 145,477 | 4/1936 | Austria | 30/302 |
| 1,075,606 | 10/1954 | France | 99/545 |

Primary Examiner—Harvey C. Hornsby
Assistant Examiner—Robert Pous

[57] ABSTRACT

Apples which have been oriented, peeled and cored on the machine shown in U.S. Patent 3,586,081 are further processed to remove the fibrous carpel tissue providing the seed cell in the apple. Following removal of the seed cell, the apples may be discharged whole or passed through a slicing device to cut the apples into a plurality of segments.

4 Claims, 33 Drawing Figures

SEGMENTING KNIFE FOR APPLE SEED CELLING MACHINE

This is a division of application Ser. No. 431,691 filed Jan. 9, 1974 now U.S. Pat. No. 3,962,963 and application Ser. No. 247,838 filed Apr. 26, 1972 now U.S. Pat. No. 3,869,974.

BACKGROUND OF THE INVENTION

In the past, apples have been peeled and cored generally with a cylindrical hole. If it was subsequently desired to remove the seed cell completely, this was done on a separate machine, the apples being picked out by hand and fed to the seed celling maching. The seed celling machine was also capable of slicing the apple into segments if desired.

SUMMARY OF THE INVENTION

The machine of the present invention eliminates any hand labor to produce apples from which the complete seed cell has been removed. If desired, after the seed cell is removed, the apples can be cut into slices.

It is in general the broad object of the present invention to provide an auxiliary machine which can be attached to that shown in U.S. Patent 3,588,081 and which is capable of removing the seed cell and thereafter slicing the apple into segments if desired from apples which have been oriented, peeled and cored on the patented machine.

In effecting this, the first step is to reduce the rate of travel of the apple machine core tube of the patented machine to cause the apple centerline to be displaced from the peeling fork centerline as the core tube is withdrawn so that a pickup pin can be inserted into the core hole as the core tube is withdrawn. This maintains the original orientation as produced by the apple machine in its secondary orientation and impalement. The apple, carried by the pin, is removed from the normal peeler path and is placed between a pair of jaws on a turret with the core hole in a predetermined position without regard to the external surface of the peeled apple. At the same time the horizontal median plane of the apple is positioned at a predetermined level in the jaws. The jaws on the turret are spring loaded toward the apple, yet are independent so that each jaw may locate the apple surface both radially of the core hole and angularly of the surface so as to secure a predetermined gripping pressure regardless of the shape or eccentricity of the apple about the core hole. The jaws are then locked together in that relationship under the spring pressure until they are released later, thus maintaining the predetermined position of the core hole.

The turret has three sets of identical jaws spaced 120° apart and is indexed through three successive stations at 120° intervals for further operations on the apple. These operations are performed at the three stations: 1. feed and grip the apple with its core hole and median plane centered; 2. cut a generally spherical cavity in the core hole to remove the carpel tissue; 3. discharge the apple, slicing it simultaneously if so desired. At the second station, a substantially spherical seed cell cavity is cut within the cylindrical core hole at a predetermined level and concentric with the core hole. This is achieved by introducing into the core hole a rotating spindle of substantially the hole diameter having a curved knife normally within the outer surface of the spindle. The lower portion of the curved knife has a radius closely approximating the spherical radius to be cut while the upper portion is of a substantially smaller radius. The knife is caused to protrude above the spindle surface and cut into the apple meat around the core hole of the apple in an increasing amount as the spindle advances and approaches the end of its stroke. The combination of the three motions; that is, rotation of the spindle, the axial motion of the spindle and the increasing protrusion causes the lesser radius on the upper portion of the knife to bore the upper half of the cavity to approximate a sphere and the lower portion of the knife to generate the lower half of the shpere. The purpose of this action is to minimize the torque transferred to the apple and which must be resisted by the grip of the jaws and to dice the waste into small units for easy separation from the slices. In expanding seed cell knives as used heretofore, the action of the knife produced a spirally formed version of onion shells which are less easily separated from the slices and also approximately doubled the cutting torque to be resisted by the jaws.

After the seed cell has been cut, the spindle is removed and the indexing turret is moved to the third station whereat a pilot pin is engaged with the apple core hole so that the jaws may be released without disturbing the alignment of the apple. When the pin is so engaged, a pusher forces the apple axially of the pilot pin through a knife grid to slice the apple into segments as desired. This knife grid is unique for it includes a plurality of tensioned, very thin, radial blades providing a minimum of resistance to cutting of the apple. The apple may be left whole, however, by removal of the knife grid.

The attainment of the foregoing provides the several objects and advantages of the present invention.

DESCRIPTION OF THE PREFERRED EMBODIMENT

Before proceeding with a detailed description of the machine, the following brief summary of the machine and its operation will be given; any reference numeral below 700 corresponds to the reference numeral utilized in U.S. Pat. No. 3,586,081. The machine of this invention is provided as an attachment on one side of the machine of the aforementioned patent. The present machine receives peeled cored apples from the patented machine and thereafter proceeds to seed-cell each apple and either cut it into segments or discharge it as a whole peeled apple from which the seed cell has been removed.

Figure 2:
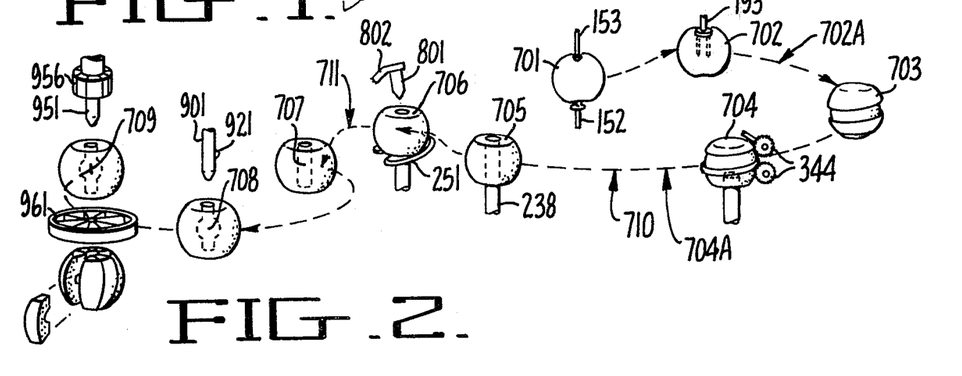
FIG. 2 is a diagram illustrating the path of travel of an apple through the machine of U.S. Pat. No. 3,586,081 and the attached device of this invention.
Figure 3:
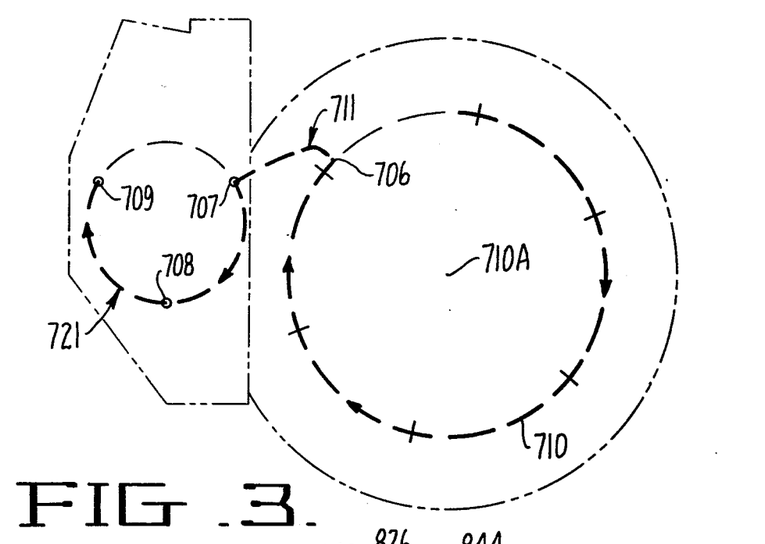
FIG. 3 is a diagrammatic showing of the path of travel of the apple through the assembled machine.

Referring particularly to FIGS. 2 and 3 in the drawings, the movement of the apple is shown diagrammatically in FIG. 2 where an oriented apple, indicated at 701, is held between indent pickup fingers 152 and 153 for subsequent impaling on fork 193 at station 702. The apple is then peeled by cutters 344 between position 702A and 704A. Subsequently, the apple is cored by the coring tube 238 between positions 704 and 705. The cored peeled apple is cut free from the fork 193 by the core tube 238 and is carried downwards and is delivered to position 706. As the apple is moving into position 706, the core tube swing cam 679 retards the forward velocity from about 12 inches per apple cycle to about 9 inches to permit the apple to be picked up by a pin 801, as will be explained, and transferred to position 707. The apple is then moved through 120° to position 708 where it comes to rest. In position 707, the apple was located so that its median plane is at a given elevation and this irrespective of the size of the apple and the core hole or center without regard to apple shape. At position 708, the apple is subject to the action of a seed celling knife 921 which removes the fibrous carpel tissue and breaks it up into small pieces for ready separation. Following removal of the carpel tissue, the apple is moved 120° to position 709 where it is either discharged as a whole apple or is cut into segments by knife 961. The path of travel of the apple in the machine of U.S. Pat. No. 3,586,081 is indicated at 710 in FIG. 3 while the transfer to the device of this invention is indicated by the arrow 711; the path of travel 710 corresponds to the path of travel 151 shown in FIG. 2 in U.S. Pat. No. 3,586,081. The three stations through which the apple is moved for pickup, coring, and slicing are indicated at 707, 708 and 709 in FIGS. 2 and 3.

Figure 1:
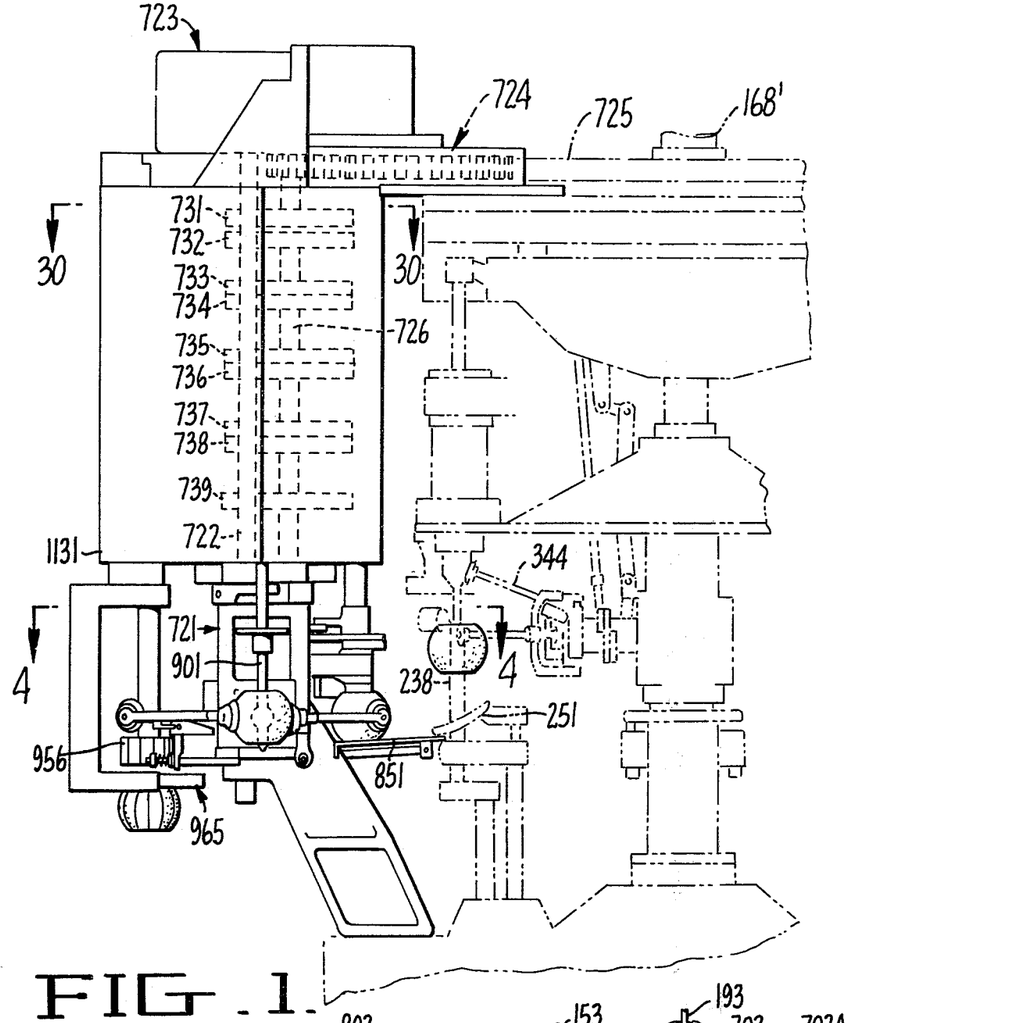
FIG. 1 is an elevation showing the device of this invention in association with the machine shown in U.S. Pat. No. 3,586,081.
Figure 4:
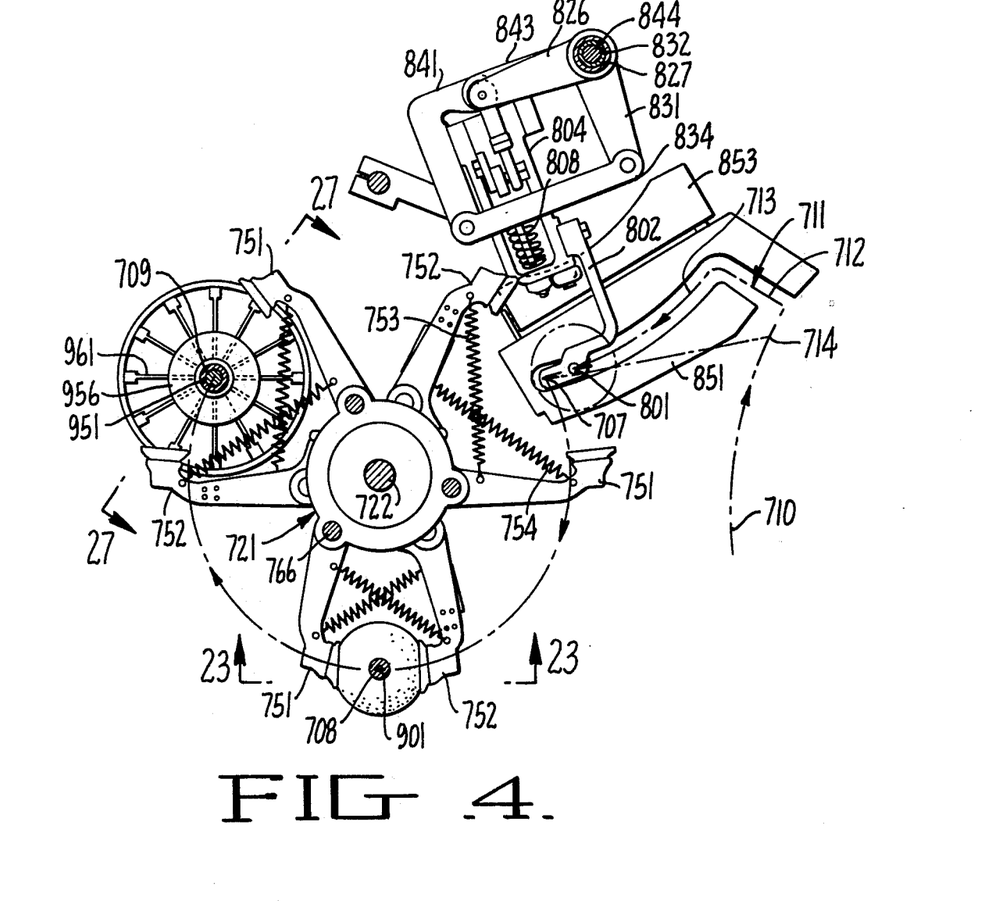
FIG. 4 is a view taken along the line 4—4 in FIG. 1.

Referring particularly to FIGS. 1 and 4, as an apple impaled on the core tube 238 moves from position 705 to 706, the core tube swing cam 679 reduces its forward velocity. At the same time, the apple is gradually stripped from the core tube 238 by contact with the stripper 251. As this occurs, pin 801 is moved downwardly from its raised position (FIG. 6) to enter the core hole in the apple as the core tube 238 is withdrawn. The pin arm 802 is finally stopped by the apple resting on the stripper plate 251. When this occurs, the apple is firmly impaled by the pin 801, as shown in the full line position in FIG. 6. The pin is provided at the forward end of arm 802 which is connected by fastener 803 on a supporting U-shaped frame 804.

IMPALEMENT OF THE APPLE BY PIN 801

Figures 8, 9, 10:
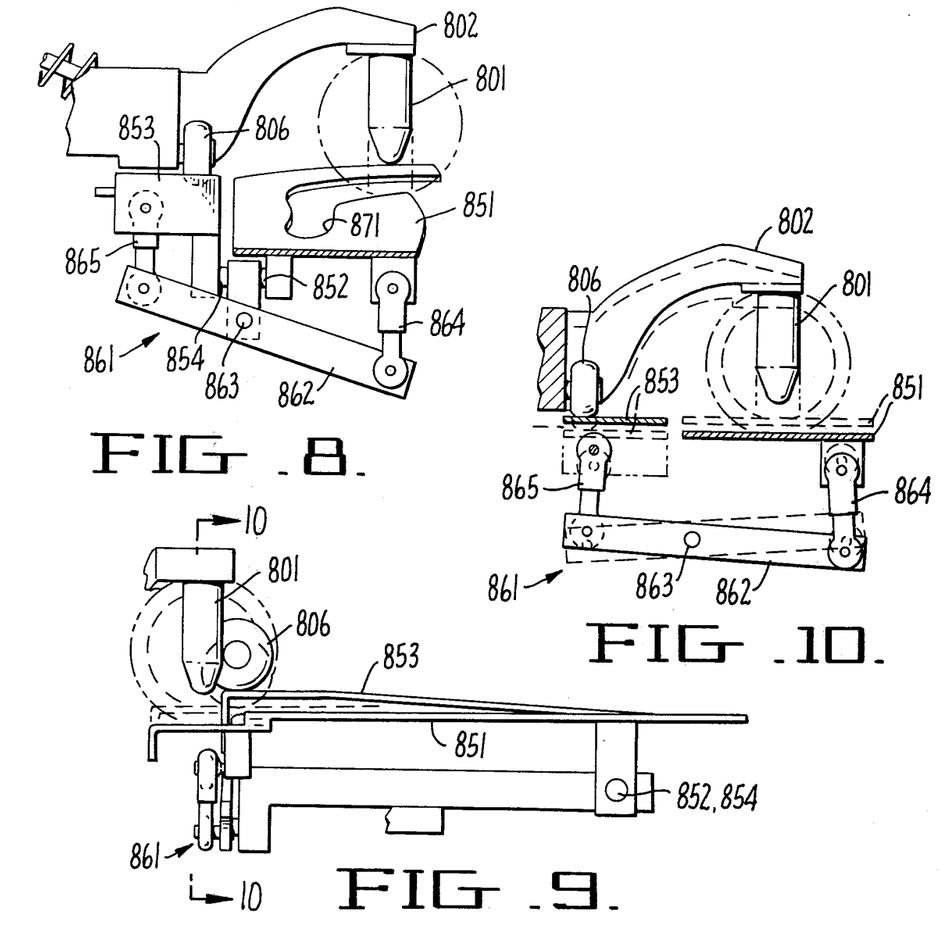
FIG. 8 is a view taken along the line 8—8 in FIG. 7, e.g., an end elevation of a portion of the mechanism for locating an apple at its median plane.
FIG. 9 is a view like FIG. 7 with the apple at the opposite end of the median plane locating mechanism.
FIG. 10 is a section taken along the line 10—10 in FIG. 9.

When the core tube 238 is fully withdrawn from the apple, the pin 801 moves the apple off the striper plate 251 and onto a slide plate 851. The apple slide plate is hinged as at 852 for vertical movement. Frame 804 has a barrel shaped roller 806 which rides along an arcuate cam ramp 853 hinged as at 854. As the roller pushes the cam ramp downwardly, the apple slide plate is forced to raise by the reverser linkage, generally indicated at 861. This, as is shown in FIG. 8, includes a lever 862 pivoted as at 863 and connected by ball jointed links 864 and 865, respectively, to the slide plate 851 and the cam ramp 853. Raising of the slide plate prevents further downward motion of the apple. The combined action of the slide plate, the reverser linkage and the cam ramp results in the median plane of the apple being placed at the same level vertically and this irrespective of the size of the apple. The apple slide plate has an arcuate slot 871 therein so that if pin 801 is longer than the core hole in the apple, the pin can ride in the slot.

The cam roll 806 is forced into engagement with the cam ramp 853 by spring 808 which is mounted on rod 807 which extends between end 809 of frame 804 and a clevis 811 on rod 807. Rod 807 is slidable through bore 812 in end 809 and carries a rubber stop 813 at its outer end. The clevis is engaged by pin 814 intermediately of a lever 816 which is pivoted on pin 817 between frame 804 on bracket 841. Compression of spring 808 allows frame 804 and associated pin 801 to be raised by barrel shaped roller 806 relative to bracket 841. When the apple impaled on the pin 801 reaches the end of its travel along the apple slide plate as shown in FIG. 9, further movement of the apple ceases to await the closure of the jaws of turret 721 as will be described later.

Figure 31:
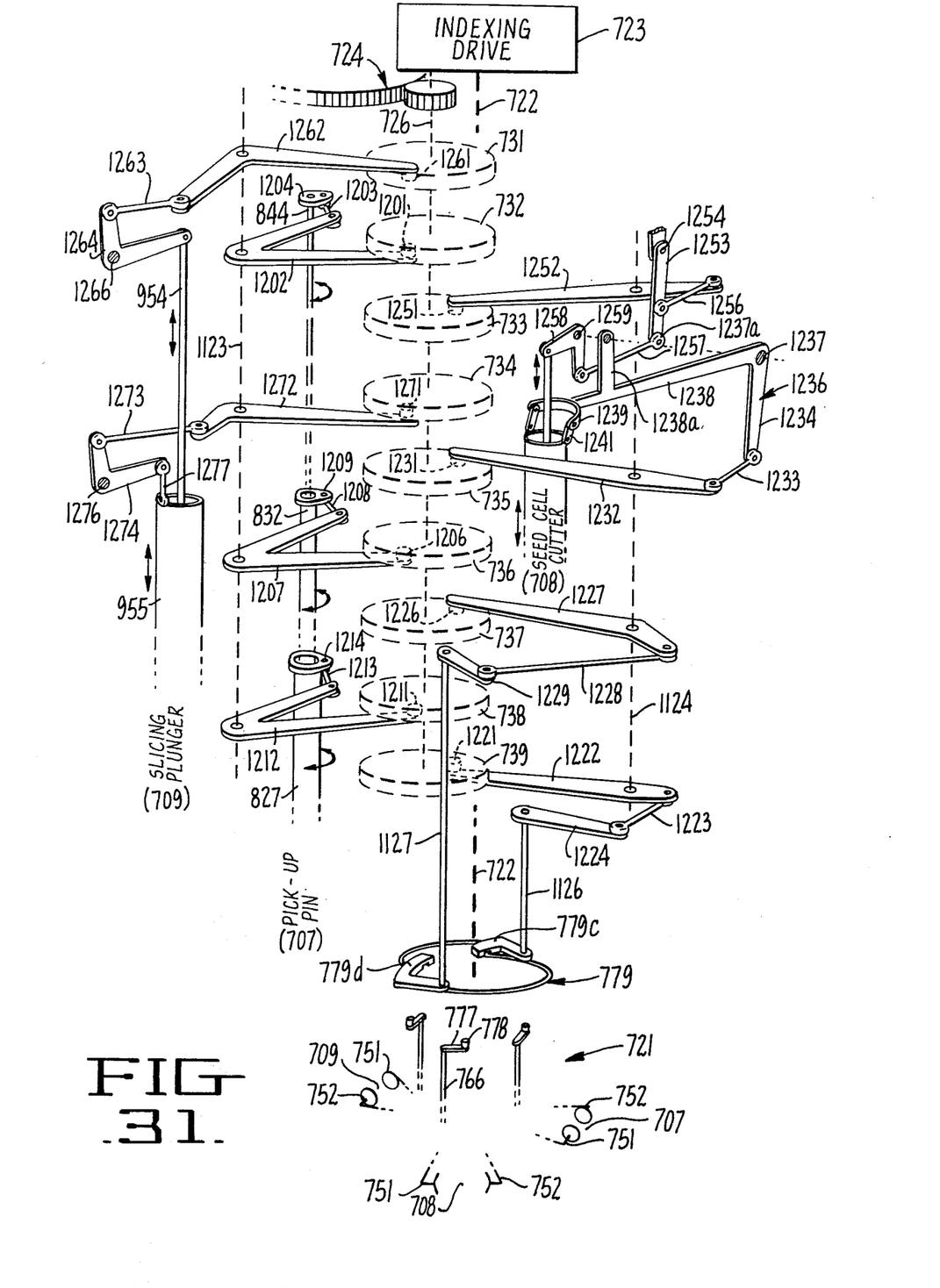
FIG. 31 is a schematic view illustrating the arrangement of the cams utilized for effecting the various motions.

Frame 804 is hinged on pin 817 carried on a C-shaped bracket 841. The pin 801 is raised and lowered by raising and lowering the frame 804. This is achieved by lifting rod 807 to bring stop 813 against end 809. As mentioned, the other end of rod 807 is a clevis which is engaged by a pin 814 with an intermediate portion of lever 816 which is hinged on pin 817. The other end of lever 816 is engaged by bolt 822 with one end of a ball jointed link 823. The other end of the link is attached by bolt 824 to arm 826 which extends from sleeve 827. Operation of tubular shaft 827 by cam 738 raises and lowers pin 801 (FIG. 31).

Figures 5, 6, 6A:
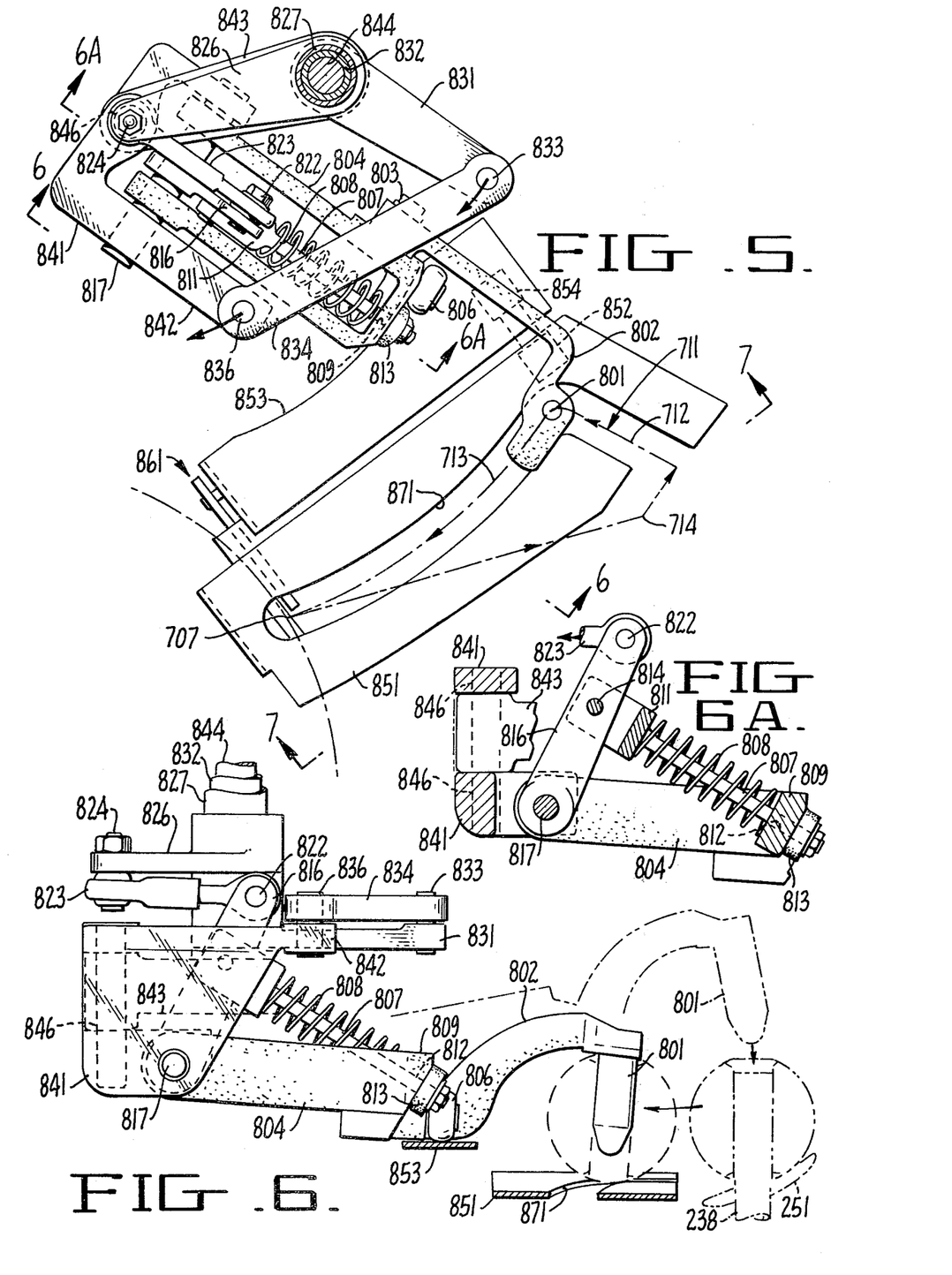
FIG. 5 is a plan view of a portion of the mechanism for locating a supported apple and positioning the various sized apples with their median planes at the same vertical elevation.
FIG. 6 is a section taken along the line 6—6 in FIG. 5.
FIG. 6A is a section taken along the line 6A—6A in FIG. 5.
Figure 7:
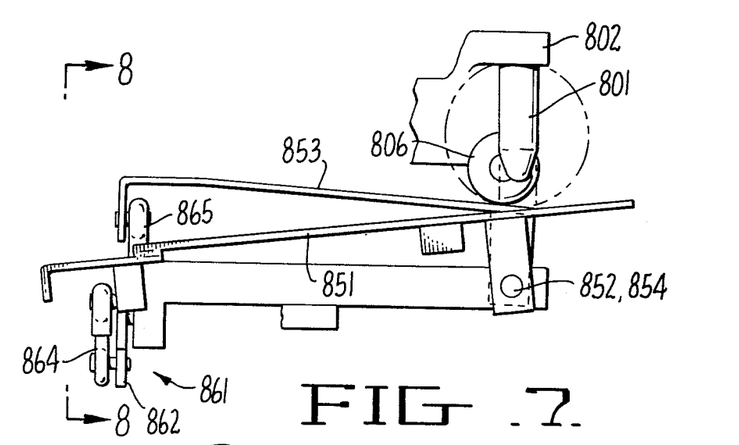
FIG. 7 is a view taken along the line 7—7 in FIG. 5.

To effect radial travel of the pin 801 from the center of the peeling turret 710A along path 712, FIG. 5, arm 843 is secured at one end on the end of shaft 844, while at its other end, bracket 841 is rotatably secured by a pin 846. When pin 801 is at point 711, motion toward turret 721 begins. To move the pin 801 so that it travels toward turret 721, an arm 831 is attached to tubular shaft 832. The other end of arm 831 is attached by stud 833 to one end of a link 834 which is attached at its other end by stud 836 to an end of arm 842 on the upper portion of bracket 841. When the pin 801 reaches the end of its travel and is in the position 707 (FIGS. 2 and 4), the apple is engaged by the jaws 751 and 752 and the pin is withdrawn from the apple as will appear. During all motions of arm 843, the arm 826 follows the motions of arms 834 so that the axis of bolt 824 and pin 846 coincide except when pin 801 is to be raised.

THE TURRET AND ITS DRIVE

As appears in FIGS. 1 and 4, a turret 721 is mounted for rotation on a vertical shaft 722. The turret moves through the three stations 707, 708 and 709 under control of an index mechanism, generally indicated at 723. A typical mechanism I have used successfully is manufactured and sold by Commercial Can and Machine Co. of Chicago, Illinois under U.S. Pat. No. 2,986,949. As the pin 801 and its impaled apple come to rest, jaws 751 and 752 move from the open position to engage the apple, the jaws being biased toward one another by springs 753 and 754.

The index mechanism 723 is driven by a gear train 724 which is in turn supplied with power from gear 725 mounted upon shaft 168' in the peeling and coring machine (FIG. 33 in U.S. Pat. No. 3,586,081). The index mechanism moves each pair of jaws of the turret through the three stations 707, 708 and 709 provided 120° apart as has been set forth. Also driven by the gear train 724 is a cam shaft 726. Mounted upon the cam shaft 726 are nine cams which, in descending order in FIG. 1, are numbered 731 through 739. The main cam shaft makes one complete revolution for each apple handled by the machine. The index mechanism 723 moves the turret 721 120° from one station to the next for each apple handled.

DESCRIPTION OF THE JAW STRUCTURE

Figure 22:
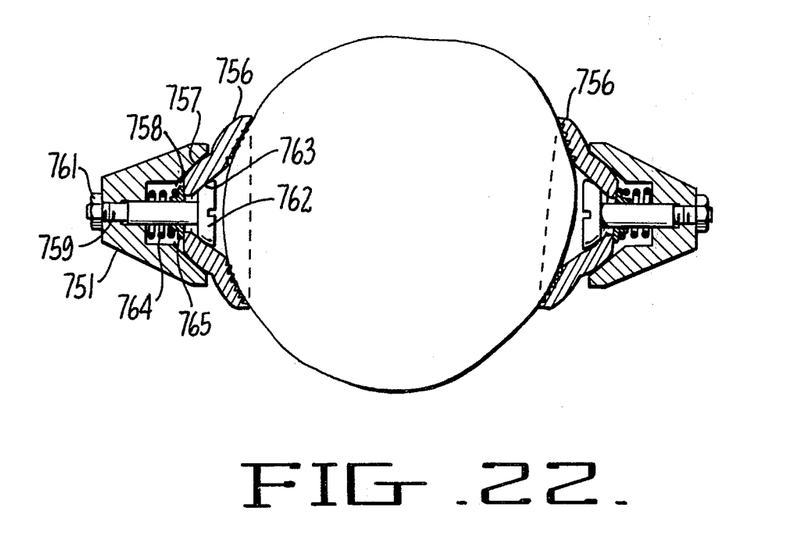
FIG. 22 is a section taken through the gripping jaws showing details of their construction.

Each jaw includes a flexible cup 756 (FIG. 22) to engage an apple. Each cup includes a spherical rear portion 757 which is received in a conical receptacle 758 in the end of each of the jaws 751 and 752. Each flexible cup is held in place by a bolt 759 threaded into the jaw and locked in adjustment by nut 761. The pin has a spherical head 762 fitting in the conical recess 763 in the bottom of the cup 756. A spring 764 and washer 765 are provided about the bolt between the arm and the bottom of the cup. In the absence of an apple, the spring 764 and washer 765 cause the cup to swivel against the head 762 and so tend to become square with the pin axis ready to receive the next incoming apple.

MOVEMENT OF THE APPLE IMPALEMENT PIN 801

The movement of the apple pickup pin 801 is controlled by three cams 738, 736 and 732 which oscillate the three concentric shafts 827, 832 and 844 (see FIGS. 4, 5, 30 and 31). Cam 738 moves tubular shaft 827, cam 736 moves tubular shaft 832 and cam 732 moves shaft 844. Cam 732 moves the pin 801 radially of the apple machine's peeling turret shaft 168', the path of movement being designated as "arm in-out" in the linear representation in FIG. 32 and represented by the dotted line 712 in FIG. 5. This movement is provided by a cam follower 1201 provided in one end of bell crank 1202 which is pivoted on shaft 1123. The other arm of the bell crank is connected by a link 1203 to arm 1204 mounted on an end of shaft 844.

Cam 736 swings the pin 801 circumferentially with respect to the apple machine peeling turret shaft 168', as indicated by the dotted line 713 in FIG. 5. This cam has a cam track having the linear configuration designated as "arm swing" in FIG. 32. The cam follower 1206 rides in the cam track, the follower being provided on one end of the bell crank 1207 which is also pivoted on shaft 1123. The other arm of the bell crank is connected by link 1208 to arm 1209 provided on the end of tubular shaft 832.

The compound action of cams 732 and 736 moves pin 801 along a path 714 to intercept an apple. Cam 738 is effective to move the pickup pin 801 vertically. This cam has a configuration corresponding to that shown linearly in FIG. 32 and designated as "finger up and down". Again a cam follower 1211 is provided on one end of a bell crank 1212, the latter being pivoted on shaft 1123 and having its other arm connected by link 1213 to arm 1214 on tubular shaft 827.

SUPPORT AND MOVEMENT OF JAWS 751 AND 752

Figure 20:
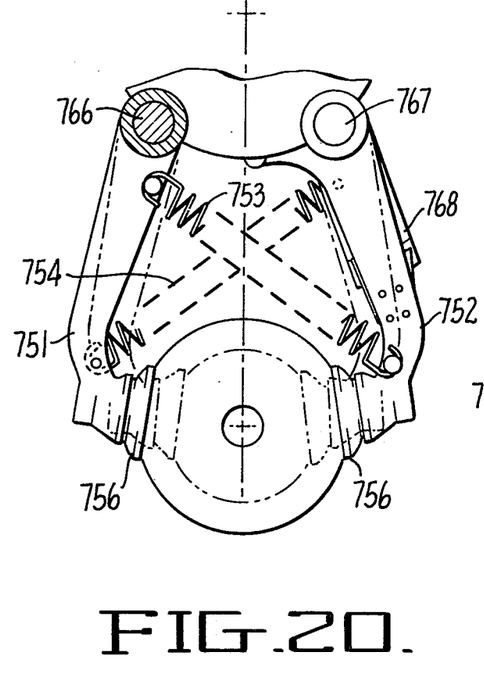
FIGS. 20 and 21 are plan views showing the operation of the gripping jaws in positions wherein the core hole in the apple is always kept central.
Figure 21:
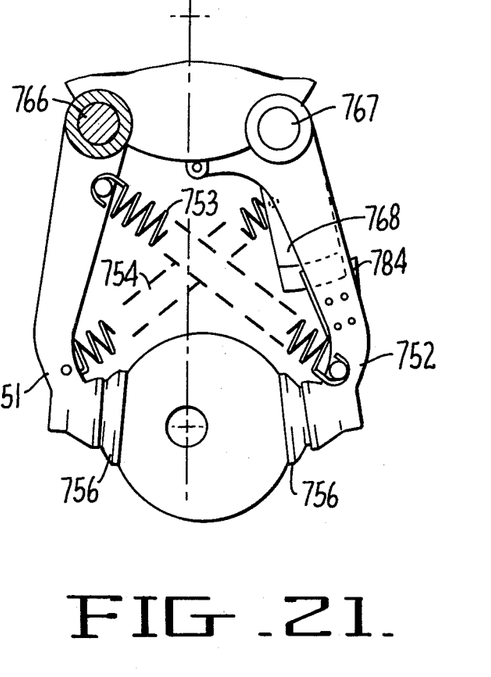

The jaws 751 and 752 are mounted for rotation on shafts 766 and 767 on turret 721. Shaft 767 also carries an arm 768 which releasably interconnects jaw 752 with jaw 751. Jaw 751 and arm 768 are in the form of bell cranks with one arm 771 and 772 of each joined by a link 773 such that they swing equiangularly from the vertical axis of the turret station. Jaw 752 is releasably connected to arm 768 through lock 774 and is spring biased toward jaw 751 by spring 753. Jaw 751 and arm 768 are similarly biased toward one another by spring 754. This arrangement allows the jaws 751 and 752 to acquire different angular displacements from the station axis and thus accommodate apples whose outer surfaces are eccentric to the core hole at the station axis (see FIG. 21). As mentioned, jaw 751 and jaw 752 and arm 768 are biased toward one another by springs 754 and 753 and this accommodates a wide variety of sizes of apples (see FIG. 20).

The jaws are moved apart to release an apple by arm 776 while they are allowed to close on an apple under the pull of springs 754 and 753 when arm 776 is retracted. This action of arm 776 is also effective to actuate lock 774 on its last movement.

Arm 776 is attached to shaft 766 which carries crank arm 777 at its upper end. Crank 777 carries a cam roller 778 in cam track 779 by which shaft 766 is oscillated. Cam track 779 has stationary track section 779a in which roller 778 rides when the jaws are in the open position and stationary track section 779b in which roller 778 rides when the jaws are in the closed position. Between these stationary track sections are two movable cam track segments which close the jaws at station 707 and open the jaws at station 709. A first segment 779c shifts cam roller 778 to allow the jaws to close when they are at station 707. The motion aligns the roller 778 with the track section 779b so that when the jaws are indexed to station 708 (FIG. 13), the jaws remain closed. A second segment 779d shifts the cam roller to open the jaws at station 709 in a similar manner. The two cam segments 779c and 779d are moved by cams 739 and 737 respectively (FIG. 31).

Figures 11, 12:
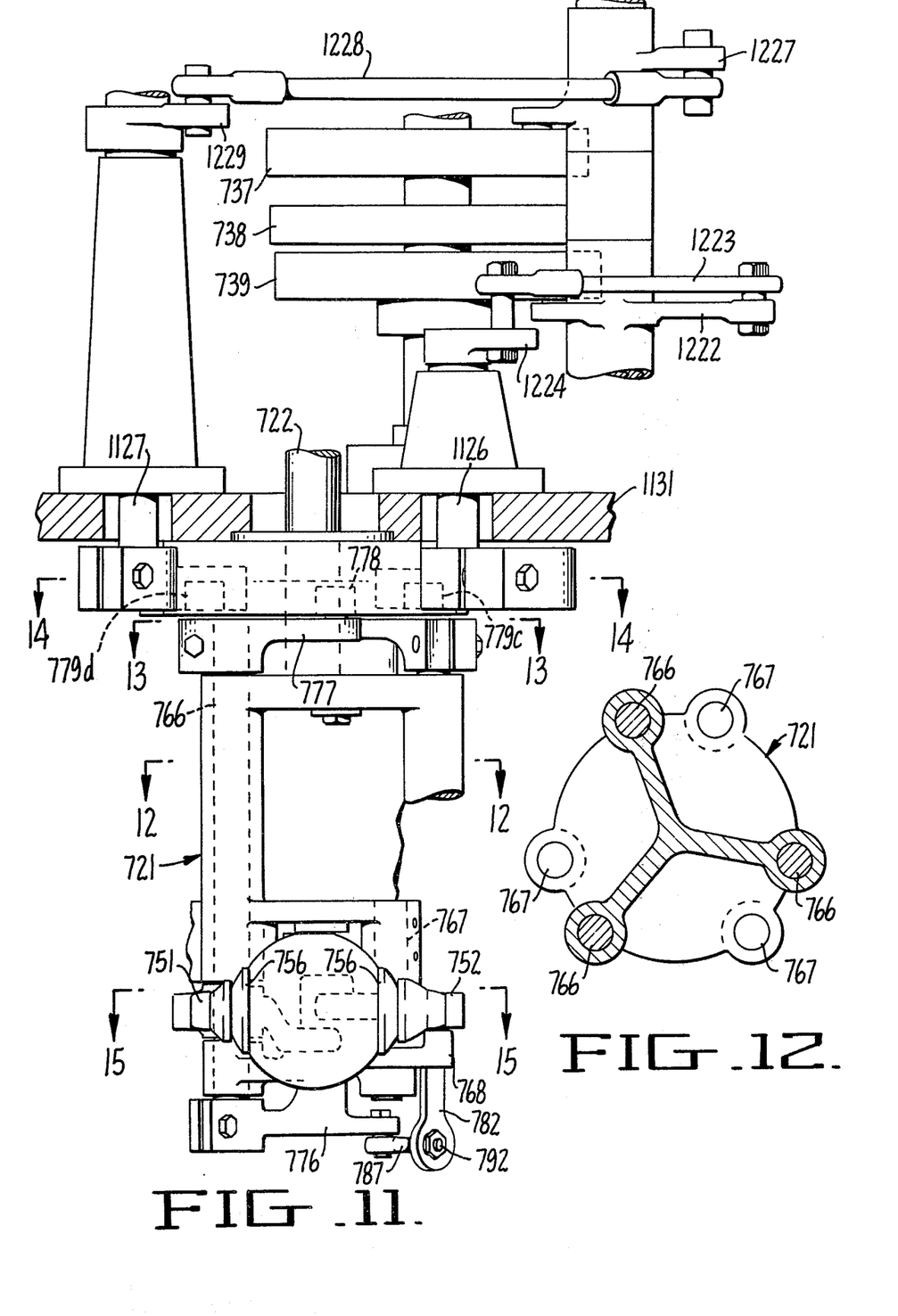
FIG. 11 is an elevation of the turret of the machine.
FIGS. 12, 13, 14 and 15 are, respectively, sections taken along the designated section lines in FIG. 11.

Cam 739 is effective to permit the jaws to close on an apple at station 707, the actual closing and apple engagement being effected by springs 753 and 754. Cam 739 has a track therein which when arranged linearly corresponds to the "jaw close" diagram in FIG. 32. A lever 1222 pivoted on shaft 1124 carries at one end a cam follower 1221 in the cam track in cam 739. The other end of lever 1222 is connected by a link 1223 to a lever 1224 secured on the upper end of shaft 1126. Shaft 1126 extends through frame 1131 and has cam segment 779c secured on its lower end (FIG. 11). To open the jaws, cam 737 has a roller 1226 which rides in a recessed track in the cam (FIG. 31) which has a configuration such that when shown linearly it corresponds to the jaw open diagram in FIG. 32. The roller 1226 is carried at one end of a lever 1227 which pivots on shaft 1124. The other end of the lever 1227 is connected by link 1228 on a crank arm 1229 secured on the upper end of a shaft 1127 which extends through frame 1131 and has cam segment 779d secured on its lower end.

At station 707, when arm 776 is moved counterclockwise (FIG. 15), the jaws will close around the apple held on pin 801 and will engage the outer surface of the apple and be seated thereon through cups 756.

Figures 17, 18, 19:
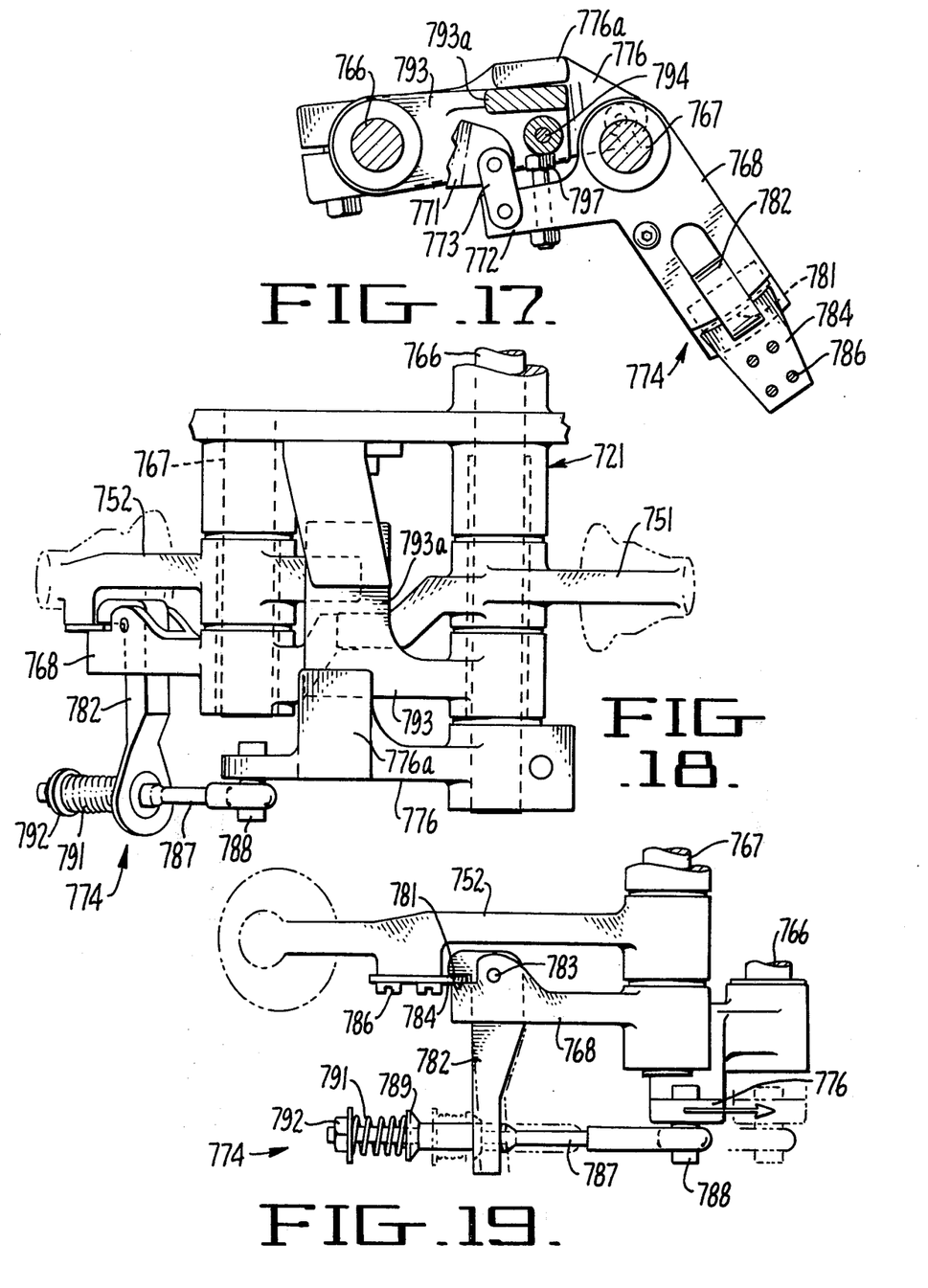
FIG. 17 is a section taken along the line 17—17 in FIG. 16.
FIG. 18 is a view taken along the line 18—18 in FIG. 15.
FIG. 19 is a view taken along the line 19—19 in FIG. 15.

This movement is also effective to actuate lock 774 applied to jaw 752 (FIG. 19). The lock is provided on arm 768 which pivots on shaft 767 and has a flat surface 781 at its outward end. A lever 782 is supported at the end of arm 768 by pin 783, the lever 782 having a similar flat surface. A thin metal plate 784 is secured by screws 786 to the underside of arm 752 so that it is between the flat surface on arm 768 and lever 782. When lever 782 is moved from the full line position in FIG. 19 to the dotted line position, the end of plate 784 is gripped between the flat surface of arm 768 and lever 782 to lock the jaw 752 to arm 768 so that the jaws 751 and 752 will maintain the relative positions in which they are engaged with an apple, and yet be able to move further toward each other under the tension of the springs while so maintaining the relationship. The rocking of lever 782 is effected by movement of lever 776 which carries a link 787 mounted thereon by a stud 788. Link 787 extends through lever 782 and has a slidable collar 789 to engage lever 782 at the end of the stroke indicated by the dotted outline. The collar 789 is preloaded by spring 791 against a shoulder on link 787 so that as soon as the collar 789 breaks away from the shoulder, the full preload force of the spring is brought to bear on the lever 782 to exert a high gripping force on plate 784. The spring is positioned between the collar and a nut and washer 792 on the end of the link.

The jaws are now gripping the apple under spring pressure and the core hole of the apple will continue to remain in the central position as the apple is indexed through the subsequent stations.

Figure 13:
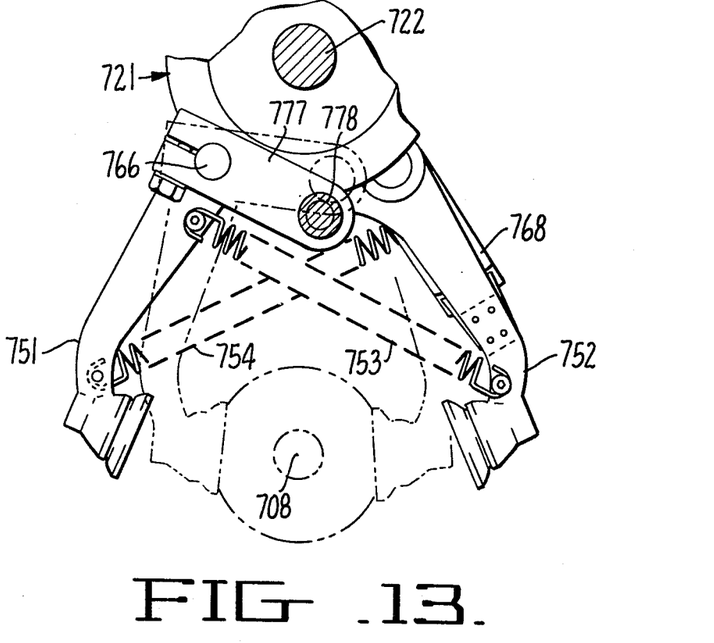
Figure 14:
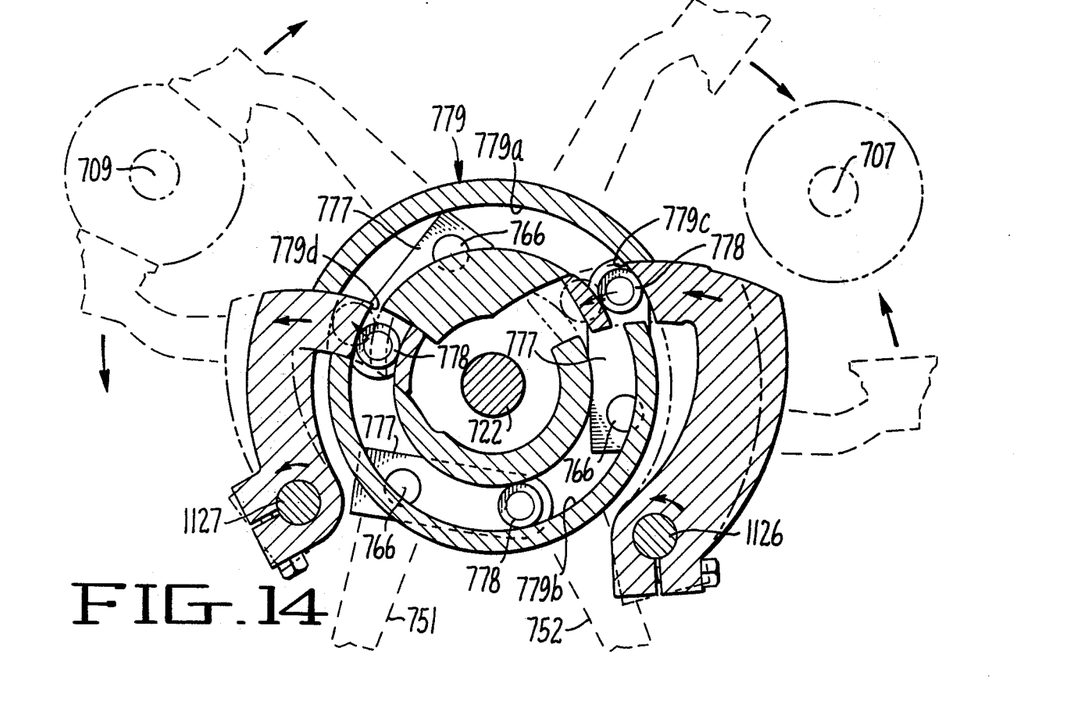
Figure 15:
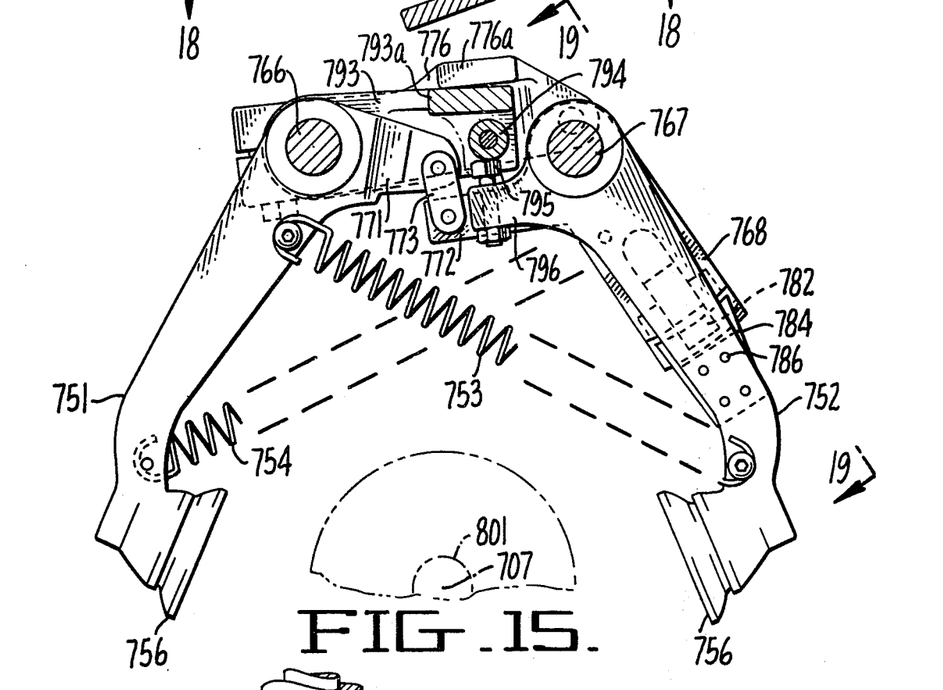
Figure 16:
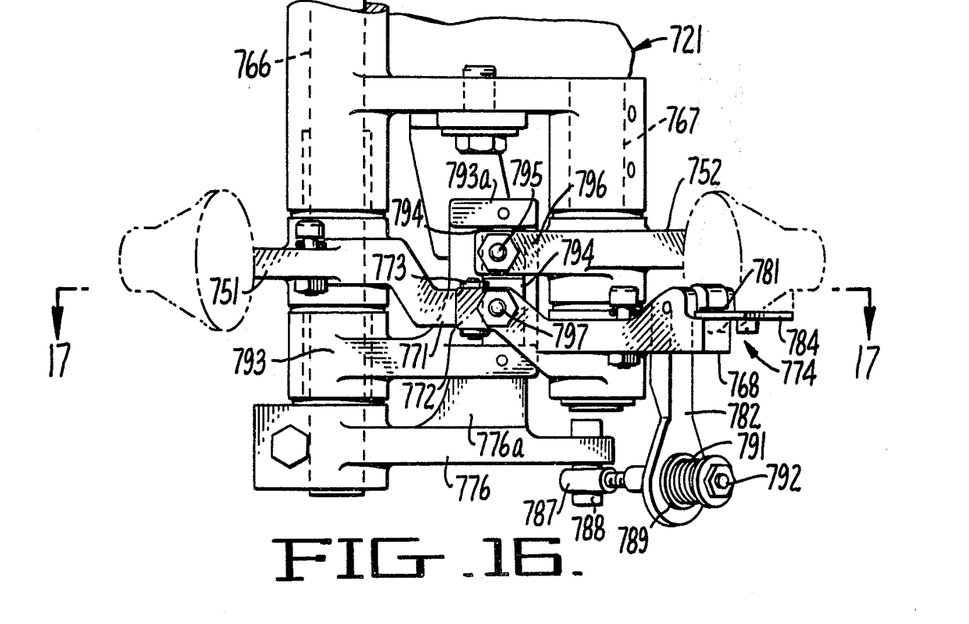
FIG. 16 is an elevation of the mechanism for operating the apple gripping jaws.

To open the jaws at station 709, cam 779d moves shaft 766 clockwise in FIGS. 13 and 15 and arm 776 moves to rock the jaws 751 and 752 away from one another and release an engaged apple.

Arm 776 has an upstanding ear 776a which engages a lever 793 rotatable on shaft 766. Lever 793 has an upwardly extending projection 793a carrying two rollers 794. Jaw 752 carries a screw 795 on crank arm 796 and arm 768 has a similar screw 797 on crank arm 772 which are engaged by the rollers 794. When the arm 776 moves against arm 793 in a clockwise direction in FIG. 15, lock 774 is released and the jaws rock away from one another with arm 768 opening jaw 751 through link 773. Screws 795 and 797 provide an adjustment to equalize the opening of the jaws.

THE SEED CELLING MECHANISM

Figure 25:
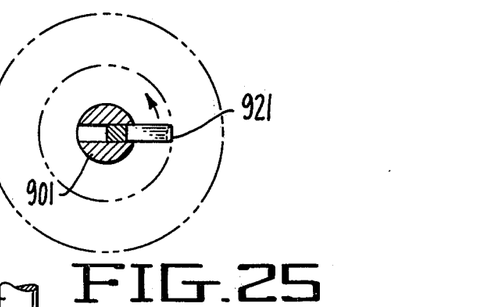
FIG. 25 is a section taken along the line 25—25 in FIG. 24.
Figure 26:
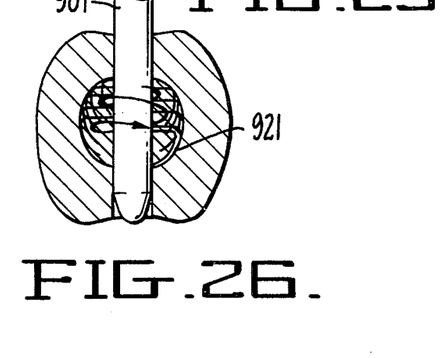
FIG. 26 is a diagrammatic view showing how the coring knife is effective to cut a spherical cavity in the apple and so remove the carpel tissue.

When the apple arrives at station 708 and comes to rest, seed cell cutting is effected. This is controlled by two cams 735 and 733, the first being effective to move a knife spindle into and out of the apple, as appears in FIG. 23, while the second cam moves the knife in and out of the spindle, as appears in FIGS. 24—26. To effect this, cam 735 includes a track thereon which, when extended linearly, corresponds to that shown in FIG. 32 as "seed cell quill". The motion is transmitted from cam 735 by a follower 1231 affixed at one end of lever 1232 which is pivoted on shaft 1124. At its other end, lever 1232 is connected by a link 1233 to a vertically extending arm 1234 on a bell crank, generally indicated at 1236 and pivoted at 1237. The other arm 1238 is formed into a yoke 1239 which, in turn, is connected by links 1241 to a rotating joint 902 mounted on the end of a hollow shaft 903. The hollow shaft 903 is carried in another hollow shaft 912 which rotates in bearings 904 and 906 provided in housing 907. Housing 907 is secured by bolts 908 to the frame 1131. Shaft 912 has a pulley 909 which is rotated by a belt 911 passed around the pulley 909 and about a pulley 1132 driven by motor 1133. The central portion of shaft 912 between the bearings is slotted as at 913. Mounted slidably within it is hollow shaft 903, the latter carrying a roller 914 which moves up and down in the slot 913. The lower end of a shaft 903 carries a circular plate 916 which acts as an oil throw-off for any oil running down shaft 903. The lower end of shaft 903 has a tubular extension which carries a knife support 901 secured in place by set screw 917. The knife 921 is mounted to a holder 921a which is pivoted by pin 922.

Figure 23:
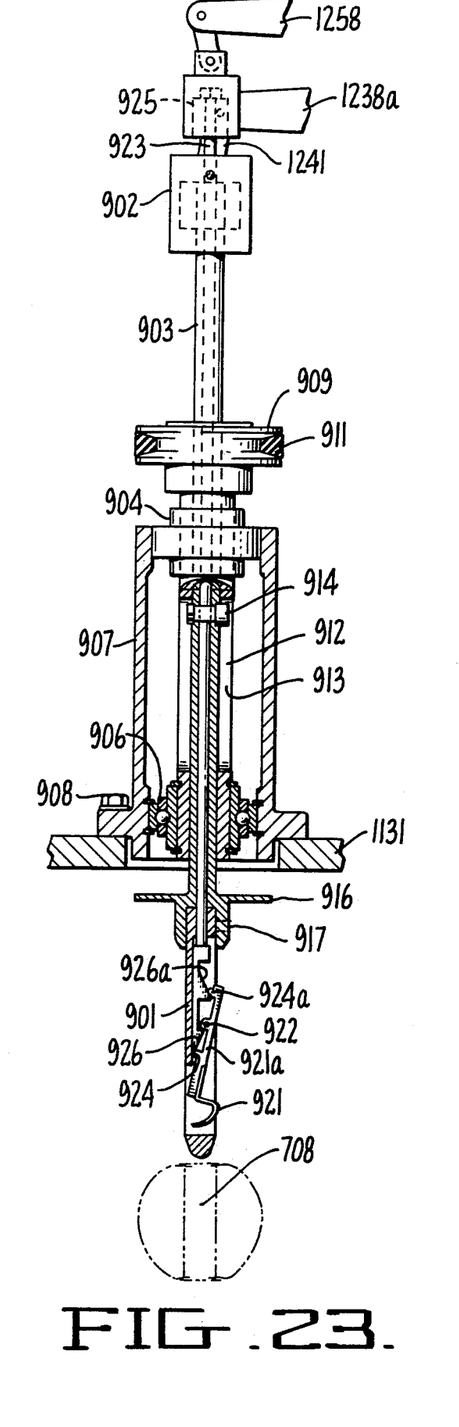
FIG. 23 is a section taken along the line 23—23 in FIG. 4.
Figure 24:
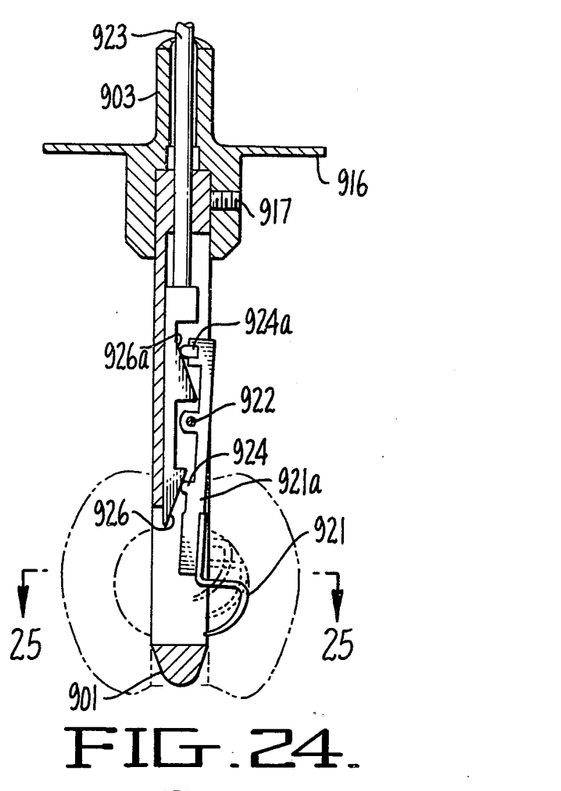
FIG. 24 is a partial elevation showing the seed celling knife extended for removing the seed cell from the apple.

The knife 921 is adapted to be swung from the retracted position shown in FIG. 23 to the extended position shown in FIG. 24. This motion being effected generally by the downward movement of rod 923 which will be presently described. At its lower end, the holder carries a nose 924 which rides over the cam surface 926, the latter being so formed that the knife is moved gradually outwardly as rod 923 is moved downwardly so that the knife cuts a semi-spherical cavity of increasing diameter as it is moved outwardly. On the opposite side of pivot pin 922 is a second nose 924a on holder 921a which engages a cam surface 926a in a manner which is complementary to the motions developed by surfaces 924 and 926, thus producing a positive action of the knife 921 inward as rod 923 is moved upwardly.

Figure 32:
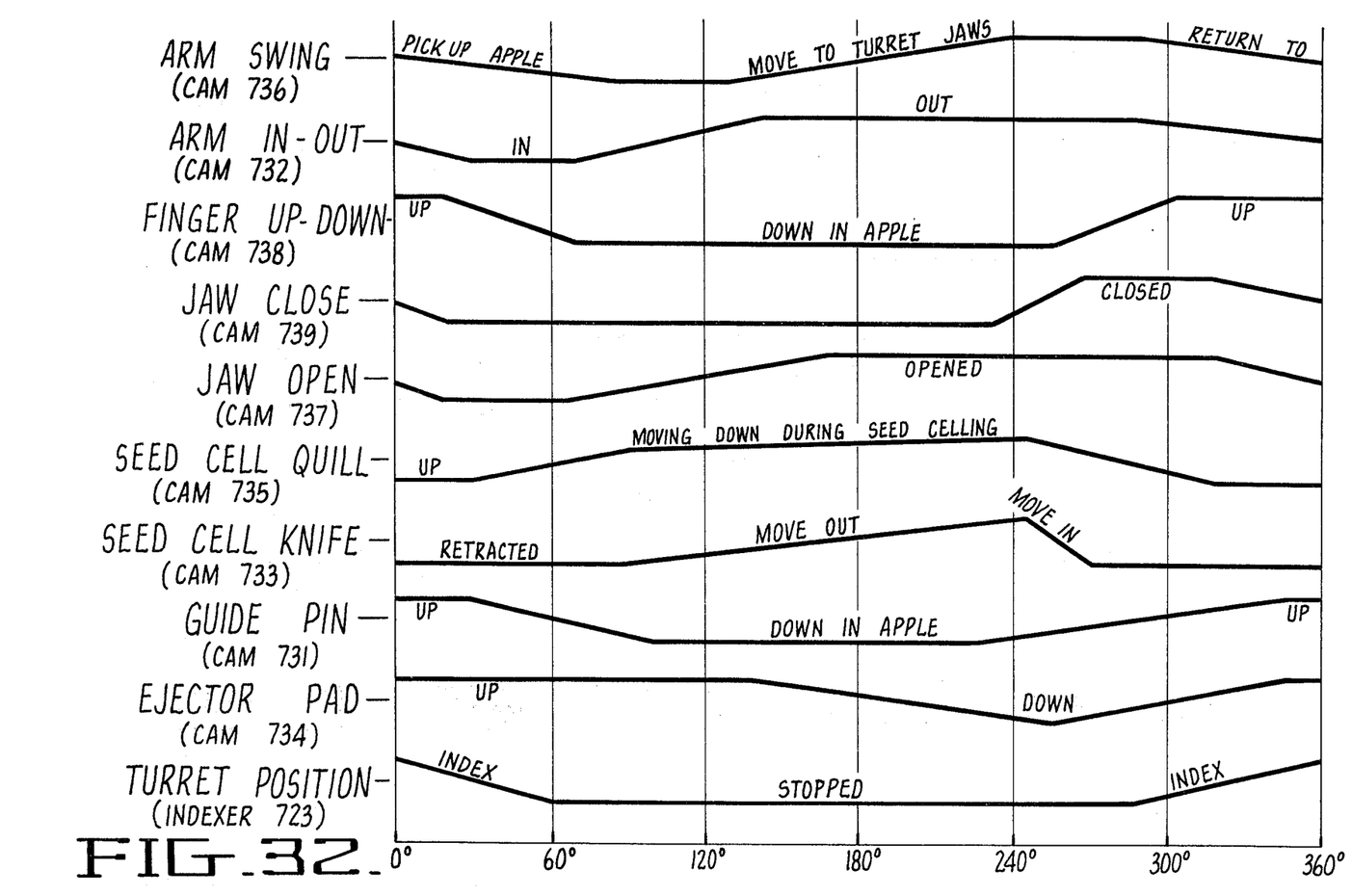
FIG. 32 is a timing chart showing the relative timing of the operations involved.

The movement of the knife into and out of the spindle is effected by cam 733 which has a track corresponding to that shown linearly in FIG. 32 as seed cell knife. The cam 733 has a cam follower 1251 engaged herewith and mounted on an end of a lever 1252 which is also pivoted on the shaft 1124. Lever 1253 is mounted by a pin 1254 on the frame of the machine. It is rocked back and forth by a ball jointer link 1256 which extends between the lever 1253 and the other end of arm 1252. Link 1257 is connected to a bell crank 1258 which is mounted by pin 1259 to an extension 1238a of arm 1238. The other arm of the bell crank is connected to the upper end of the rod 923 through a rotary joint 925 to move the knife into and out of the knife spindle. The link 1256 is adjustable for length and is adjusted so that the axis of pivot pin 1237a is in line with the axis of pivot pin 1237 of arm 1236 except when knife 921 is extended.

The combination of the slow downward motion of spindle 923, the increasing protrusion of the knife 921 and the five or more revolutions of the spindle during such motions produce a substantially spherical cavity within the apple with a minimum of torsional effort applied to the apple and with good dicing of the waste cell material so that it separates readily from the apple. Upon completion of the cutting of the seed cell, the knife 921 is retracted and knife support 901 is withdrawn completely from the apple.

SLICING THE APPLE INTO SEGMENTS

Following removal of the seed cell from the apple, the turret 721 is indexed to move the apple from position 708 to position 709 (FIG. 2) with the cylindrical hole remaining central. In position 709, it is engaged by pin 951 which is substantially the size of the hole and enters the core hole present in the apple so the apple is guided by the pin 951 as has been explained (see Movement of the Apple Impalement pin 801). Upon this occurrence, the grasp of jaws 751 and 752 is released, as has been explained, and the jaws are moved to the fully opened position and the apple remains in position 709 guided by the pin 951. The apple may then be discharged off the pin as a whole apple or it may be forced by pad 956 through knife assembly 965. The latter is supported on the frame by three ears 962. A plurality of slicing blades 961 are supported in tension within the knife frame or ring 964. The end of each knife blade is received in a mounting member 967 to which it is secured with silver solder. The opposite end of each blade is silver soldered into hub 966. Each mounting member is held in place by a self-locking screw 968 which engages the member adjacent the upper side of the blade. These screws (on the outer ends of diametrically opposite blades) oppose each other and so can develop an axial tension in the blades. A self-locking screw 969 is engaged with a shallow hole in the lower portion of the mounting member 967. These screws are adjusted to contact the member 967 and so develop a force couple which will resist the downward thrust of the apple. The net result is that the blades can be made much thinner, of the order of 0.020 inch, and still remain straight, whereas the blades used heretofore have been about 1/16 inch in thickness because they were only supported at their outer end.

The underside of the pad 956 is provided with a plurality of slots 957 forming segments which pass between the knife blades 961 and so force the apple through the knife. Movement of the pin 951 and the pad 956 is effected by cams 731 and 734, cam 731 moving the guide pin to engage the apple while cam 734 pushes the apple axially of the guide pin and through the knife grid.

Figures 27, 28, 29:
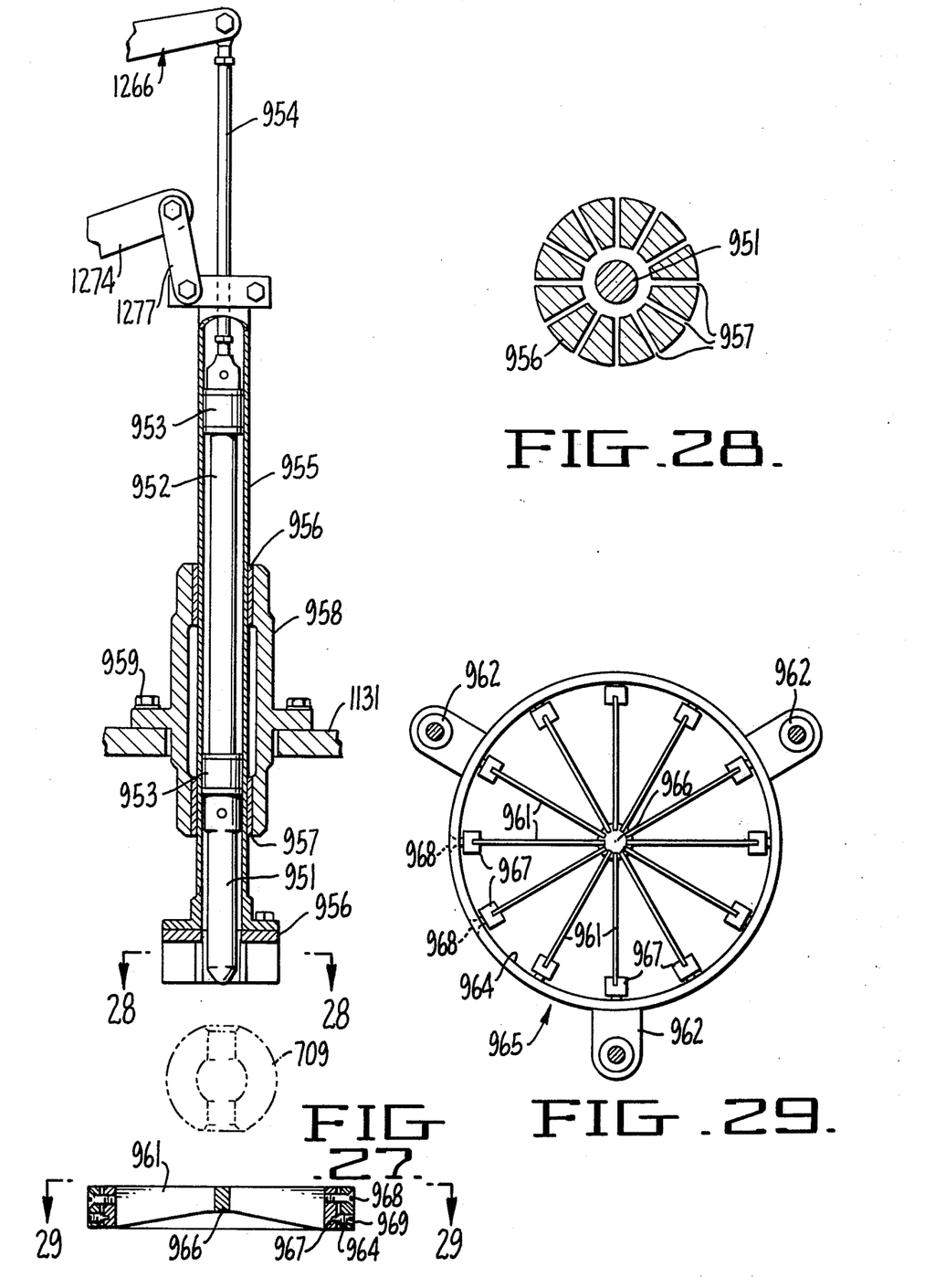
FIG. 27 is a section taken along the line 27—27 in FIG. 4 showing the mechanism utilized to force the apple through the cutting knife to cut the apple into segments.
FIG. 28 is a section taken along the line 28—28 in FIG. 27.
FIG. 29 is a section taken along the line 29—29 in FIG. 27.
Figure 30:
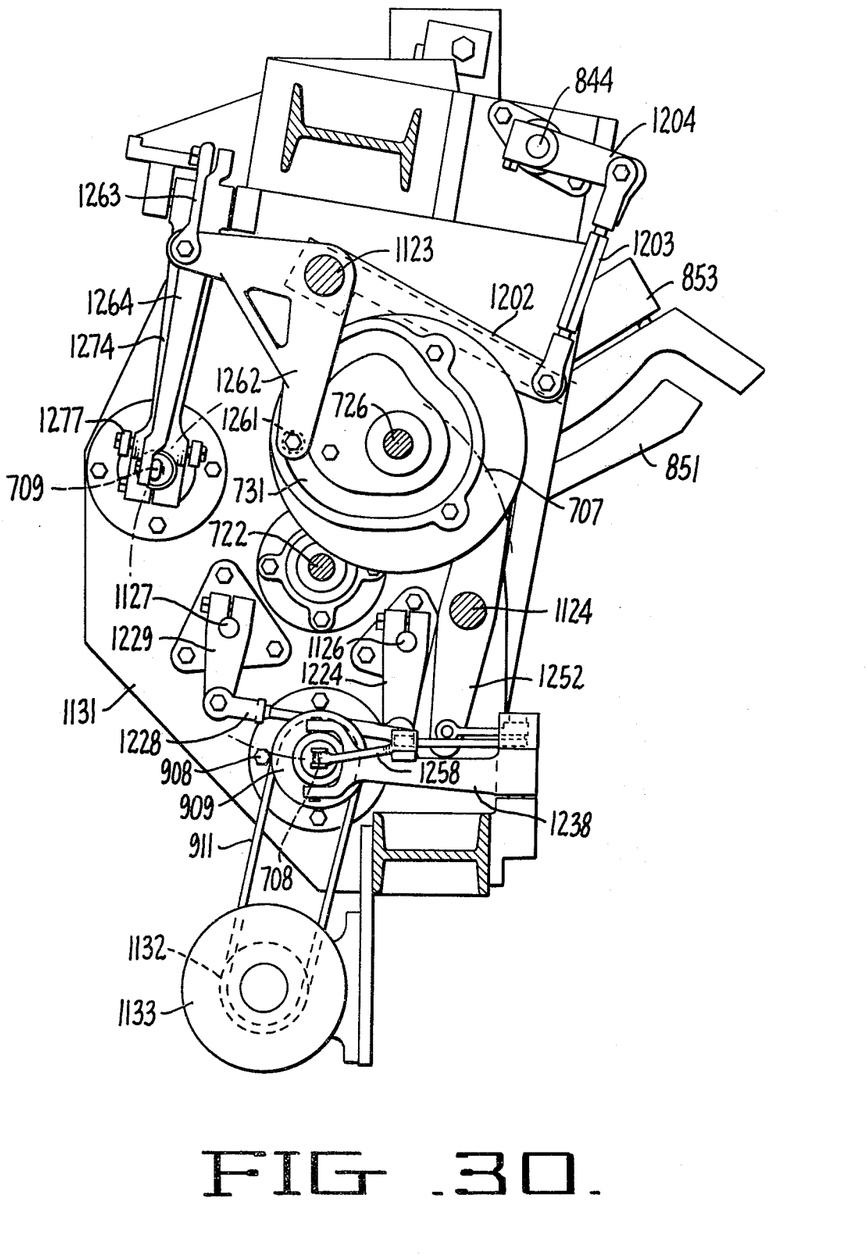
FIG. 30 is a section taken along the line 30—30 in FIG. 1.

Referring particularly to FIG. 27, pad 956 is supported at an end of the tubular member 955 which is slidably mounted in bearings 956 and 957. Tubular support 958 is secured by bolts 959 on the frame 1131 of the machine. Pin 951 is mounted on an end of rod 952, the latter having spaced bearings 953 which support the rod 952 for sliding movement in the tube 955. Pin 952 is connected by link 954 to the actuating mechanism.

Referring to FIG. 31, the vertical reciprocation of the link 954 and pin 951 is effected by cam 731, the latter having a cam track thereon corresponding to that shown linearly in FIG. 32 as "guide pin". Follower 1261 is engaged with the cam track of cam 731, the follower being at one end of a lever 1262 which is pivoted on vertical shaft 1123. At its other end, lever 1262 is engaged with ball jointed link 1263, the latter being secured at one end to the bell crank 1264 pivoted at 1266. The other arm of the bell crank is engaged by link 954 which in turn is secured to guide pin rod 952.

The pad 956 is raised and lowered by cam 734 which has a cam track therein corresponding to that which appears under "ejector pad" in FIG. 32. Cam track in cam 734 is engaged by a roller 1271 provided on one end of a lever 1272 which is also pivoted on shaft 1123. The other end of the lever is engaged with a ball jointed link 1273 and one end of which is engaged with a bell crank 1274 pivoted as at 1276. The other end of the bell crank is joined by link 1277 to the upper end of tube 955.

I claim:

1. A knife for cutting apples into segments, comprising: an outer circular ring; a hub provided centrally of the ring; a plurality of thin, flat, elongate knife blades each having opposite flat sides and opposite edges and each fixedly secured at one end to the hub and extending radially between the hub and the ring with the flat sides of each blade lying in planes parallel to the axis of the circular ring, the other end of each knife blade being fixedly secured in a mounting member; and means engaged between the ring and members exerting an axial tension force on the blades to maintain the blades straight upon travel of an apple through the knife.

2. A knife as in claim 1, wherein the means engaged between the ring and members comprises a first screw extended radially inwardly through the ring into threaded engagement with the member.

3. A knife as in claim 2, wherein the first screw is threadably engaged with the member nearer one edge of the blade than the other, said one edge comprising a cutting edge of the blade for cutting an apple.

4. A knife as in claim 3, wherein a second screw is threaded radially inwardly through the ring into engagement with the member at a location nearer the said other edge of the blade than to said one edge, thus imparting a force couple in the member and blade to assist the blade in resisting deformation during the cutting of an apple.

* * * * *